UNITED STATES PATENT OFFICE.

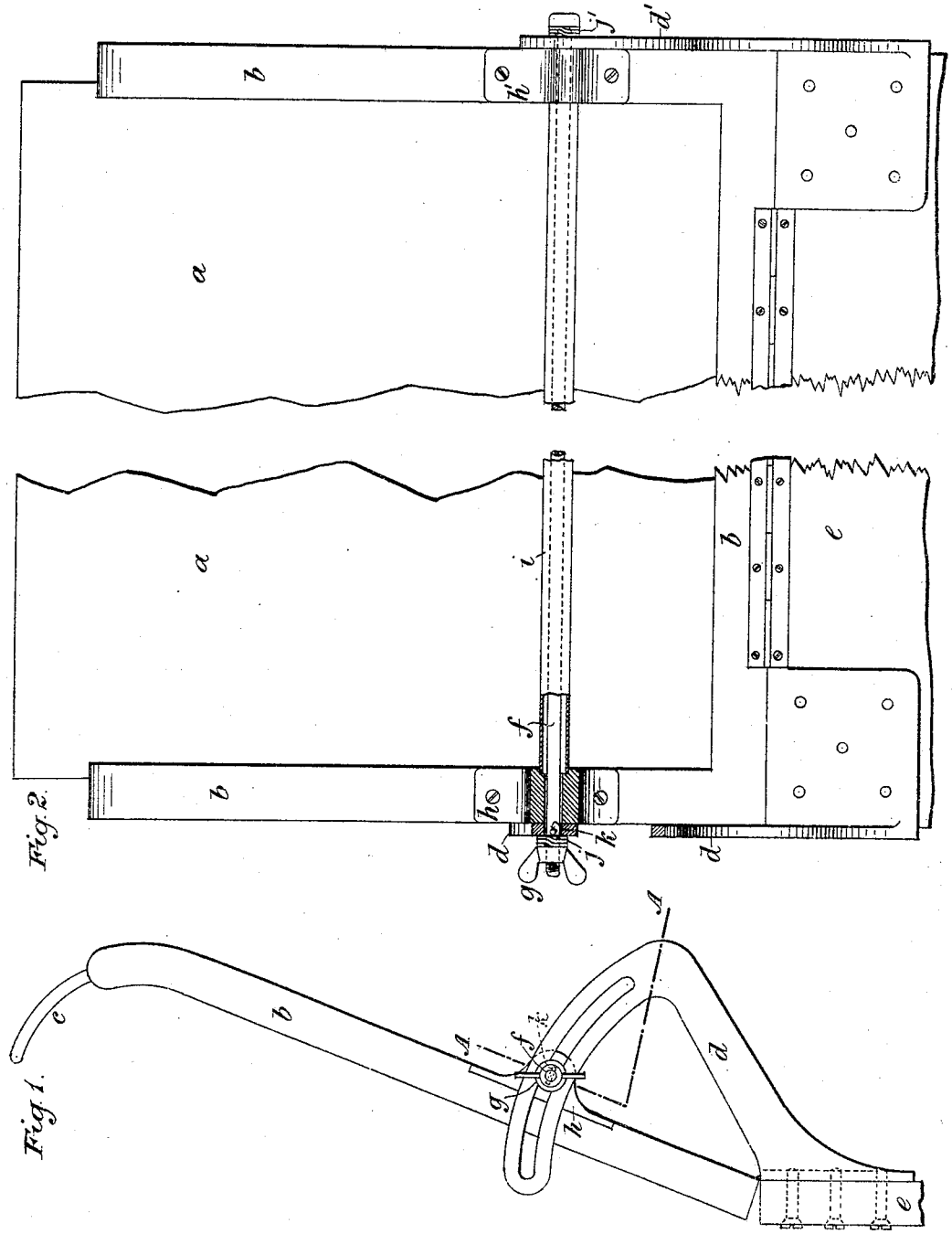

JAMES HODGSON, OF CARLISLE, ENGLAND.

MOTOR-CAR WIND-SCREEN.

940,529.   Specification of Letters Patent.   Patented Nov. 16, 1909.

Application filed January 9, 1909. Serial No. 471,481.

*To all whom it may concern:*

Be it known that I, JAMES HODGSON, a subject of the King of Great Britain, residing at Carlisle, England, have invented new and useful Improvements in Motor-Car Wind-Screens, of which the following is a specification.

The said invention relates to hinged wind screens for motor cars and consists in the improvements hereinafter described and illustrated in the accompanying drawings whereby better protection from wind is afforded to the occupants of the car and the fixing of the screens when adjusted is facilitated.

The said improvements consist in curving the upper portion of the glass of the screen so as to deflect the current of air passing from the front thereof and in fixing mechanism coöperating with the slotted brackets for supporting the screen, said mechanism being of such construction as to be operable by manipulation thereof at one side only of the car instead of requiring manipulation at both sides as is the case with the heretofore known constructions of motor car wind screen fixing mechanism.

The said invention is illustrated in the accompanying drawings Figure 1 of which is an edge view of a hinged glass motor car screen provided with the aforesaid mechanism together with a portion of the car to which it is hinged and Fig. 2 is a rear face view of portions of the same partly in section taken on the line A A Fig. 1.

$a$ is the glass portion of the screen which is mounted in a frame $b$ and curved at the upper part forwardly and upwardly as illustrated at $c$ for the purpose hereinbefore stated.

$d$ $d'$ are slotted brackets secured to the front part $e$ of the car on either side of the hinged screen for supporting the same at various angles. The fixing means consist of a screw bolt $f$ extending from side to side of the screen and passing through the slots in the brackets $d$ $d'$ and having a head at one end and a clamping screw nut $g$ at the other and mounted in metal bearings $h$ $h'$ screwed to the screen frame $b$. Extending from one to the other of the said bearings $h$ $h'$ is a metal tube $i$ having its ends mounted in the said bearings for the purpose of preventing strain upon the screen due to the clamping action. $j$ $j'$ are helical springs around the said bolt $f$ between the outer sides of the slotted brackets $d$ $d'$ and the head and nut $g$ of the said bolt respectively for the purpose of preventing any undue binding of the parts after the clamping pressure has been relaxed by unscrewing the said nut. The spring $j'$ is particularly useful for avoiding objectionable friction between the head of the bolt $f$ and the bracket $d'$ during adjustment of the screen which friction would otherwise be liable to occur notwithstanding entire removal of the clamping pressure at the nut end of the said bolt.

$k$ is a cross pin in the part of the bolt $f$ working in the slot of the bracket $d$ for the purpose of restraining turning of the said bolt when the nut $g$ is being operated.

I claim:—

1. A wind screen for motor cars comprising a hinged section in combination with means operable at one side only of said section for retaining it in adjusted position, said means including slotted fixed supports at the ends of said section, bearings mounted on said section above the hinge thereof, and a threaded bolt extending longitudinally of said section across one face thereof and mounted in said bearings and having its ends extending through the slots of said supports, said bolt being provided with a head at one end and having a loose screw nut engaged with its other end, said nut being arranged when turned upon the bolt to exert a clamping pressure directly upon the adjacent support and also through said bolt and its head upon the other support.

2. A wind screen for motor cars comprising a hinged section in combination with means operable at one side only of said section for retaining it in adjusted position, said means including slotted fixed supports at the ends of said section, bearings mounted on said section above the hinge thereof, a bolt arranged longitudinally of said section across one face thereof and mounted in said bearings having its ends extending through the slots of said supports, said bolt being provided with a head at one end and a screw nut at the other end, said nut being arranged to exert a clamping pressure directly upon the adjacent support and also through said bolt and its head upon the other support and a compressible device interposed between one of said supports and an abutment on the bolt for the purpose set forth.

JAMES HODGSON.

Witnesses:
 PERCY CHARLES RUSHEN,
 WILLIAM THOMAS WHITEMAN.